Patented May 27, 1947

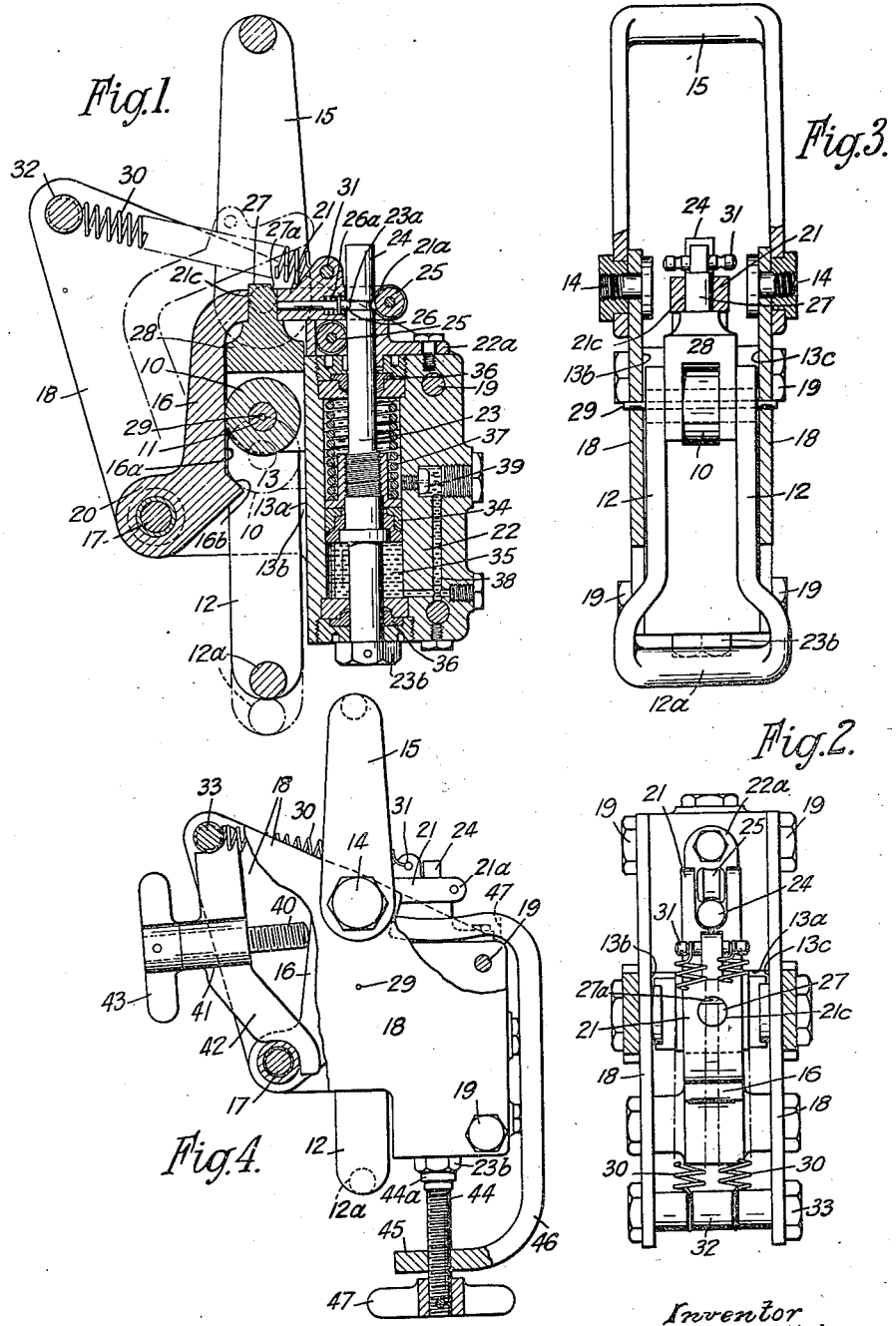

2,421,152

UNITED STATES PATENT OFFICE 2,421,152

LOAD COUPLING DEVICE FOR PARACHUTES

George Frederick Jones, Highgate, London, England, assignor of two-thirds to G. Q. Parachute Company, Limited, Woking, Surrey, England, a joint-stock corporation of Great Britain Application October 5, 1942, Serial No. 460,811
In Great Britain March 10, 1942

6 Claims. (Cl. 294—83)

This invention relates to load-carrying parachutes and more particularly to disconnectible means for coupling the load to a parachute-fitted carrier employing one or more parachutes.

The invention has for its principal object to provide an improved coupling device which, when the load reaches the ground, water or other terrestrial support, becomes automatically disconnected so as to release the parachute-fitted carrier.

Another object is to provide a latching gear which will hold the load and parachute (or parachutes) in coupled relationship so long as the load is air-borne and to provide means for automatically opening or freeing said latching gear when the load is no longer air-borne.

A further object is to provide adjustable timing means to predetermine a period of time, starting when the load becomes air-borne, before the lapse of which period, the disconnection of the load from the parachute or parachutes cannot possibly take place.

A still further object is to provide a safety device in the form of a member sheared by the initial pull as soon as the load becomes air-borne after launching from e. g. an aircraft, which safety device otherwise prevents the disconnection of the load and parachute-fitted carrying means.

Other objects are to supply means engageable with the latching gear for resetting the latter and to utilise a moving part of the timing means as a temporary stop or bar to the opening or freeing of the latching gear.

The invention is hereinafter described with reference to the accompanying drawings, in which:

Fig. 1 is a part-sectional elevation of a coupling device embodying the invention.

Fig. 2 is a plan view, parts being broken away.

Fig. 3 is a part-sectional elevation on the line 3—3 of Fig. 1.

Fig. 4 shows two screw clamps used for setting the coupling device in engaged position, part being broken away.

In the construction illustrated, the coupling members consist of a roller 10 mounted upon an axle 11 carried between two parallel links or plates 12, and a box 13 along which the roller can travel in a direction towards or away from an axis 14 on which the box is pivoted, the two links 12 and the pivotal axis 14 being connected respectively to the load and to the parachute, or vice versa; the links 12 are shown integral with a cross bar 12a, forming a shackle, and a similar shackle 15 is mounted on the pivotal axis 14. The tread of the roller 10 engages with two opposite sides of the box, one of these sides 13a being rigid and the other being formed by an abutment lever 16 hinged upon a pin or bolt 17 between cheeks 18 extending from the remaining two sides 13b 13c of the box; the latter sides, with their extensions or cheeks 18, may be integral with the rigid side 13a but are preferably separate and held firmly together by bolts 19 passing through holes in the rigid side or back of the box. The hinged side or abutment lever 16 has a flat portion 16a along which the roller 10 can travel and an oblique face 16b against which the roller abuts when drawn along by the pull in the load connections. Behind this abutment face 16b, the hinged side or lever 16 has a cranked or offset portion 20 through which the hinge pin 17 passes. At the other end of the flat portion, the hinged side or lever 16 has an arm 21 extending at right angles thereto across the open end and past the rigid side 13a of the box, where it overhangs a timing cylinder 22 having a plunger or piston rod 23 movable parallel to the roller 10. The extremity 24 of the plunger engages in the forked end 21a of the arm, which carries a roller 25 engaging with the side of the plunger. In the position shown, the plunger holds the flat portion 16a of the hinged side or lever 16 parallel to the rigid side 13a of the box, and is itself latched in engagement by a spring-controlled rod 26 slidable along a hole 21b in the arm 21, one end of the rod entering a notch or groove 23a on the plunger as the rod slides towards the forked end 21a.

This abutment lever 16 constitutes the intermediate or latching gear which locks the coupling members in engagement.

A transverse hole 21c in the lever arm 21 is normally engaged by a bevel-edged peg 27 upon a block 28 sliding inside the box 13, this block supporting the axle 11 and roller 10 and moving together with them but in contact with the rigid side 13a of the box. When the peg 27 is fully engaged in the arm, a safety pin 29 made of soft metal is pushed through transversely aligned holes in the axle 11 and cheeks 18, so as to keep the block 28 at the adjacent end of the box, the roller 10 being therefore clear of the abutment face 16b of the lever; the application of a sufficient pull to the shackles 12, 12a and 15, through their connections between the parachute and the load, will cause the shearing of this safety pin 29, thus allowing the peg 27 to withdraw from the hole 21c and the block 28 to slide along the box 13 until the roller 10 comes into contact with the oblique abutment face 16b by a preliminary movement between the coupling members. From this condition, corresponding to the moment when the parachute begins to support the load, the timing cylinder 22 comes into action to determine the point at which the coupling members 10 and 13 are to be left free to disengage automatically when the load is taken up by the ground or other support.

So long as the load connections remain under tension, with the coupling roller 10 bearing upon the rigid side 13a of the box and pressed against the oblique abutment face 16b on the opposite side, the force acting upon this oblique face tends to maintain the abutment lever 16 in its normal position, with the flat portion 16a parallel to the rigid side 13a of the box; a contrary moment is applied to the abutment lever by a pair of tension springs 30 attached to the opposite ends of a pin 31 extending transversely of the lever, these springs being housed for the greater part of their length between the fixed parallel cheeks 18 of the box and attached at their other ends to a distance piece 32 clamped between the cheeks 18 by a bolt 33. The springs 30 exert a constant control tending to shift the abutment lever 16 from its normal position, the strength of the springs and the distance between their line of action and the hinge pin 17 being so selected that so long as there is any considerable pull upon the load connections, the reaction at the oblique abutment face 16b remains sufficient for overcoming the spring control. As soon, however, as the load connections are substantially relieved of tension, for example by the load hitting the ground or some object thereon, the force acting on the abutment face 16b will vanish and the springs 30 will cause the abutment lever 16 to swing outwards around its hinge pin 17 to the position shown in dotted lines in Fig. 1; the oblique abutment face 16b will thus be moved aside from the roller 10, releasing the latter together with its fittings, so that the parachute and its load will part.

Before the abutment lever 16 can be moved from its normal position, it is necessary for the timing cylinder 22 to free the lever by withdrawing the extremity 24 of its plunger from the roller 25 in the forked end of the abutment lever arm 21; the initial pull upon the load connections will have sheared off the safety pin 29 passing through the axle 11 of the roller-supporting block 28 and drawn this block along the box 13 until the roller 10 presses against the abutment face 16b, the peg 27 being thereby removed from its hole 21c into which the end of the spring-controlled rod 26 can slide so as to withdraw its other end from the notch or groove 23a on the plunger.

The timing cylinder 22 now begins its operation; the plunger 23 is provided with a piston 34 fitting inside the cylinder barrel 35, from the two ends of which the plunger projects through suitable packing 36 to prevent escape of oil or other liquid with which the cylinder is filled; at the end adjacent to the lever arm 21, the cylinder is fitted with a guide block 22a supporting another roller 25 engaging with the plunger 23 on the side opposite to that engaged by the roller 25 on the arm 21. A spring 37, coiled around the plunger on one side of the piston 34, tends to force it towards the opposite end of the cylinder, the oil being allowed to pass through channels 38 in the cylinder body and the rate of flow being controlled by a metering device such as an adjustable needle valve or, (as shown), a screw plug 39 with a calibrated orifice.

By adjustment of the needle valve or exchange of the screw plug 39, the rate of travel of the plunger 23 may be varied to give the required delay in the withdrawal of its extremity 24 from the forked end 21a of the abutment lever arm, after which the force acting upon the abutment face 16b will continue to hold the lever in its normal position so long as its moment about the hinge axis exceeds the contrary moment due to the springs 30.

It will be noted that the introduction of the delay-action mechanism represented by the timing cylinder 22 prevents the parting of the load connections by undesired separation of the coupling members, for example in the early stages of the drop, when the application of the support afforded by the parachute to the falling load may set up vibrations in the connections; unless time is given to allow the conditions to become stable, there will be a danger of the load being released prematurely in mid-air.

When engaging the parts of the coupling, the abutment lever 16 must be brought to normal position against the action of the control springs 30, and the timing cylinder 22 must have its plunger returned against the action of the spring 37. For these purposes, two separate devices may be employed, as shown in Fig. 4. The abutment lever 16 is engaged by the point of a clamping screw 40 mounted in the boss 41 of a spider 42, the legs of which are hooked over and under the pins or bolts 17 and 33 between the cheeks 18; upon turning the screw 40 by means of its head 43, the lever 16 can be forced back into normal position, ready for the peg 27 to be engaged in the transverse hole 21c of the lever arm. The projecting extremity of the plunger 23, which is fitted with a nut 23b forming a stop to limit its inward movement, is similarly engaged by the point of a screw 44 mounted in the boss 45 of a clamp 46, the other end of which is forked at 47 to fit on either side of the guide block 22a; the point of the screw 44 is shown provided with a washer member 44a to engage the plunger nut 23b. When the screw 44 is turned by means of its head 47, the plunger 23 will be forced back against the action of the spring 37, the oil or other liquid flowing back through the channels 38; the other end of the plunger is thus pushed through between the two guide rollers 25 until the nut 23b abuts against the end of the cylinder. The notch or groove 23a will then be in line with the slidable rod 26, which engages therein under the action of its control spring 26a or may be forced into engagement by the bevelled face 27a of the peg 27 when the latter is lifted into the hole 21c of the lever arm; in order to enable the angular position of the notch or groove 23a to be checked in relation to the rod 26, an index may be marked on the end of the plunger, which can be turned by means of the nut 23b, if necessary. The insertion of the safety pin 29 will complete the locking of the coupling members and the clamping devices can then be removed.

The guiding of the plunger 23 between the two rollers 25, one mounted in the forked end 21c of the abutment lever arm and the other in the guide block 22a on the cylinder, reduces the frictional resistance to movement of the plunger so that the time of operation is less affected by possible variations of that resistance than in the case of a plain guide hole in which the plunger might bind under pressure.

The automatically disconnectible couplings of this invention have been designed more particularly for parachutes to be utilised in the laying of mines, the launching of rescue-boats and the dropping of containers for the delivery of supplies or equipment to air-borne troops who have landed.

The sequence of operations in the device illustrated, is the following. The initial pull applied to the shackles 12, 12a and 15, as soon as the load becomes air-borne by deployment of the parachute, shears the pin 29, thus allowing the peg 27 and block 28 to slide until the roller 10 contacts with the abutment face 16b. Due to this preliminary movement the parachute now supports the load through contact between the parts 10 and 16b. The delay-action mechanism commences to function as the rod 26 moves across the hole 21c vacated by the peg 27, and leaves the groove 23a in the plunger rod 24. The plunger rod commences its travel under the action of the spring 37 and finally escapes from the fork arm 21, the weight of the load holding the roller 10 on the face 16b, still locking the coupling members together.

When the load contacts with the ground, the force acting on the face 16b is automatically removed and the springs 30 thereupon pull over the pivoted lever 16 with its fork arm 21 so as to open the latching gear. The load-carrying shackle 12, 12a, roller 10 and block 28 thereby become freed from the remainder of the parachute-carried latching gear, so that the coupling members separate under the pull of their respective connections, the load being thus released from the parachute.

It will be noted that the preliminary movement of the parts 12—10—28 following the shearing of the safety pin 29 as a result of the initial pull of the load-connected member upon the parachute, causes the roller 10 to make contact with the oblique abutment face 16b, and the load-connected member thereby assumes its second position upon the latching gear.

Any convenient form of delay-action mechanism may be substituted for the timing cylinder described in connection with the above embodiment of the invention.

What I claim is:

1. Coupling device for connecting a load to a parachute, comprising a first member connected to the load, a second member connected to the parachute, a latching gear arranged between said first and second members and adapted to hold said members in engagement so long as the air-borne load is acting upon said latching gear, means for transferring the load-connected member whilst engaged by said latching gear from a preliminary to a second position on said latching gear, means for freeing the load-connected member from said second position when the load is no longer air-borne, and adjustable means for delaying the action of said freeing-means until after the lapse of a predetermined period of time.

2. Coupling device for connecting a load to a parachute, comprising a first member connectible with the load, a second member connectible with the parachute, a latching gear arranged between said first and second members and adapted to hold them together so long as the air-borne load is acting upon said latching gear, a shearable pin interposed between said first and second members, means for transferring the load-connected member from a preliminary to a second position upon said latching gear, means for automatically freeing the load-connected member from said second position when the weight is no longer air-borne and adjustable timing means for preventing said freeing means from coming into operation within a limited period after shearing of said pin for transfer of said load-connected member to said second position.

3. Coupling device for connecting loads to parachutes, comprising a first member connectible with a load, a second member connectible with a parachute, a latching gear arranged between said first and second members and adapted to hold them in coupled engagement so long as the load is air-borne, means for transferring the load-connected member from a preliminary to a second position on said latching gear means for releasing said latching gear to permit disconnection of said first and second members when the load is no longer air-borne, means for preventing the operation of said releasing means until after the lapse of a predetermined period of time from the said transfer from the preliminary to second position, and means for controlling the commencement of the time-period.

4. Disconnectible coupling means for coupling a load to a parachute, comprising a first member connectible with the load, a second member connectible with a parachute, a latching gear interposed between said first and second members and locking said members in engagement so long as the air-borne load is acting upon said gear, said latching gear including a pivoted abutment lever having an oblique face thereon, and a roller engaging with the oblique face of said abutment lever and against which face the said roller is drawn by the pull in the load connections, said abutment lever being thereby held in a locking position to obstruct disconnecting movement of the said first and second members by a force acting between the said two members in consequence of the load being air-borne, and means for automatically freeing said latching gear when the load is no longer air-borne.

5. Coupling device for connecting loads to parachutes, including a first member connectible with a load, a second member connectible with a parachute, a latching gear interposed between said first and second members and locking them in engagement so long as the air-borne load is acting upon it, said latching gear comprising a spring-fitted abutment lever with an oblique face, a forked arm at the free end of said abutment lever, said lever and forked arm secured to said second member, a pivoted roller engaging the oblique face of said lever, and a peg movable with said roller, said roller and peg secured to said first member, means for displacing said abutment lever to release said latching gear, and a timing mechanism for controlling the operation of said lever-displacing means, said timing mechanism and said peg being engageable with said forked arm.

6. In a coupling device, a latching gear including a box connectible with a parachute and having a movable side formed by an abutment lever pivoted on said box, a forked arm at the free end of said lever, said arm having an aperture therein, an oblique face to said lever, a block movable within said box and connectible with a load to be carried by a parachute, a peg integral with said block, a roller carried by said block, said peg normally engaging the aperture in said arm, said roller contacting with said oblique face to hold said block enclosed in said box so long as the said load is air-borne, and time-controlled means for swinging said lever to free said roller from contact with said oblique face when the load is no longer air-borne.

GEORGE FREDERICK JONES.

REFERENCES CITED

The following references are of record in the file of this patent:

UNITED STATES PATENTS

| Number | Name | Date |
| --- | --- | --- |
| 1,507,706 | Miller | Sept. 9, 1924 |
| 1,845,466 | Williams | Feb. 16, 1932 |
| 2,057,699 | Williams | Oct. 20, 1936 |
| 2,131,445 | Lawton | Sept. 27, 1938 |
| 2,234,752 | Fleet | Mar. 11, 1941 |
| 2,270,317 | Larson | Jan. 20, 1942 |